United States Patent [19]

Fong

[11] Patent Number: 5,259,086
[45] Date of Patent: Nov. 9, 1993

[54] MUSICAL TOOTHBRUSH

[75] Inventor: Peter S. Fong, Monterey Park, Calif.

[73] Assignee: Advanced Technology Products, Inc., Whittier, Calif.

[21] Appl. No.: 869,360

[22] Filed: Apr. 14, 1992

[51] Int. Cl.⁵ .............................................. A46B 9/04
[52] U.S. Cl. .................................... 15/105; 15/167.1; 84/94.2; 403/361; 403/410; 434/263
[58] Field of Search ...................... 15/105, 145, 176.1, 15/176.6, 167.1; 16/114 R, 114 A; 24/429, 662, 671; 84/94.2; 403/361, 410; 434/263; 446/81

[56] References Cited

U.S. PATENT DOCUMENTS

| | | | |
|---|---|---|---|
| 623.701 | 4/1899 | Brisselet | 24/662 |
| 2,325,691 | 8/1943 | Litwin et al. | 403/361 |
| 2,495,667 | 1/1950 | Vizner | 24/662 |
| 2,501,822 | 3/1950 | Kuyler . | |
| 2,745,689 | 5/1956 | Balint et al. | 403/361 |
| 2,800,825 | 7/1957 | Toussaint | 84/94.2 |
| 2,926.487 | 3/1960 | Stone . | |
| 3,122,959 | 3/1964 | Barr | 84/94.2 |
| 3,138,813 | 6/1964 | Kaplan . | |
| 3,170,265 | 2/1965 | Goldfarb . | |
| 3,206,889 | 9/1965 | Ryan . | |
| 3,998,234 | 12/1976 | Stubbmann . | |
| 4,341,230 | 7/1982 | Siahou | 434/263 |
| 4,744,124 | 5/1988 | Wang et al. | 15/105 |
| 4,866,807 | 9/1989 | Kriet et al. | 15/105 |
| 4,892,434 | 1/1990 | Miller | 403/361 |
| 4,919,559 | 4/1990 | Belleville | 403/361 |
| 5,044,037 | 9/1991 | Brown . | |

FOREIGN PATENT DOCUMENTS

| | | | |
|---|---|---|---|
| 3149233 | 4/1983 | Fed. Rep. of Germany | 15/105 |
| 22059 | 11/1947 | Finland | 24/662 |
| 69927 | 1/1946 | Norway | 403/361 |
| 1406181 | 9/1975 | United Kingdom | 403/361 |

Primary Examiner—Harvey C. Hornsby
Assistant Examiner—Mark Spisich
Attorney, Agent, or Firm—Stetina and Brunda

[57] ABSTRACT

A musical toothbrush has a elongate handle having proximal and distal ends. Bristles are formed at the distal end of the elongate handle and a music box is removably attached to the proximal end of the elongate handle. The music box has a housing within which a music generator is disposed such that it may conveniently be actuated by a child prior to brushing the teeth. A retainer disposed within the housing releasably retains the toothbrush upon the handle. The retainer has a tensioner assembly and a plurality of teeth disposed proximate the tensioner assembly such that the proximal end of the toothbrush is positionable intermediate the tensioner assembly and the teeth. The tensioner assembly urges the proximal end of the toothbrush handle toward the teeth such that the tips of the teeth are substantially depressed and therefore frictionally engaged to the proximal end of the toothbrush handle. Thus, the music box is removably attachable to the proximal end of the toothbrush handle such that the toothbrush may be utilized with or without the music box in place.

7 Claims, 1 Drawing Sheet

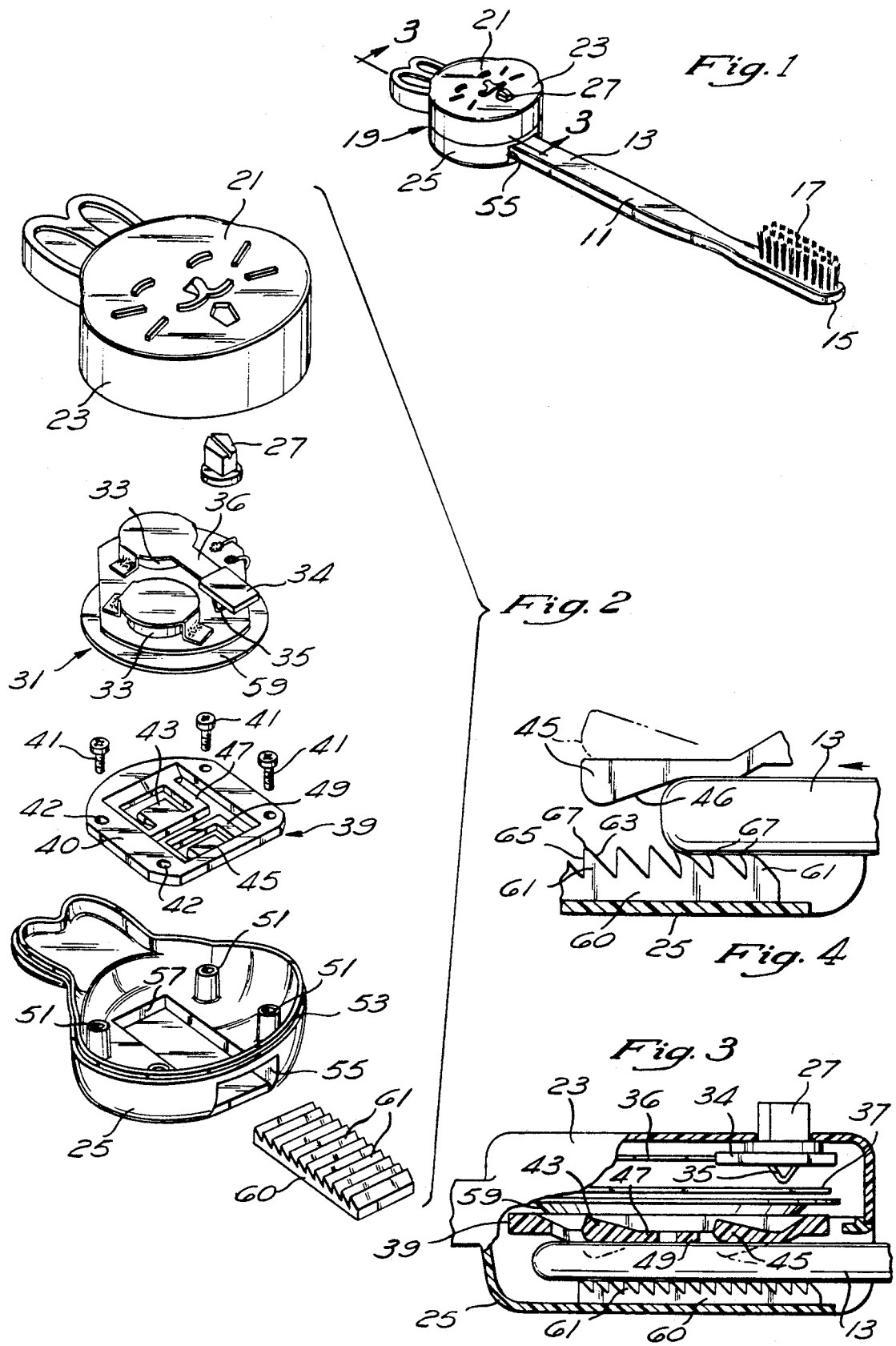

MUSICAL TOOTHBRUSH

FIELD OF THE INVENTION

The present invention relates generally to articles of manufacture utilized for grooming an personal hygiene. It relates more particularly to a children's toothbrush having a removably attachable music box which encourages brushing.

BACKGROUND OF THE INVENTION

Although the benefits of brushing one's teeth are widely recognized, children do not always appreciate such benefits. Thus, it is frequently difficult to get young children to brush as frequently as desirable and to brush for a therapeutic length of time. Of the children neglect proper brushing because they dislike the practice or because they simply forget to do it. These children often only brush their teeth reluctantly as a result of parental coercion.

Toothbrushes commonly used in the prior arty are generally comprised of an elongate handle having a plurality of bristles extending perpendicularly from the distal end thereof. As such, prior art tooth brushes possess no particulars appeal for young children and indeed may often be somewhat intimidating thereto. At best, young children will acquire an attitude of indifference toward the tooth brush itself while generally perceiving the act of brushing the teeth as undesirable. The act of brushing is generally perceived as undesirable by such young children because of their lack of understanding of the benefits afforded thereby, because of the time required to accomplish brushing, and possibly because of the use of such an unappealing device as the common toothbrush.

Thus, although such prior art toothbrushes have proven generally suitable for their intended purposes, they possess inherent deficiencies which detract from their overall effectiveness, particularly when used by young children.

SUMMARY OF THE INVENTION

The present invention specifically addresses and alleviates the above-mentioned deficiencies associated in the prior art. More particularly, the present invention comprises a musical toothbrush having an elongate handle proximal and distal ends. Bristles are formed at the distal end of the elongate handle and a music box is removably attached to the proximal end of the elongate handle.

The music box generally comprises a housing and a music generation means. An actuation means or button is disposed upon the housing such that it may conveniently be actuated by a child prior to brushing the teeth.

A retention means disposed within the housing releasably attaches the toothbrush to the handle. The retention means has a tensioner assembly and a resilient frictional engagement means. The resilient frictional engagement means comprises a plurality of teeth disposed proximate the tensioner assembly such that the proximal end of the toothbrush is positionable intermediate the tensioner assembly and the resilient frictional engagement means. The tensioner assembly urges the proximal end of the toothbrush handle toward the plurality of teeth such that the tips of the teeth are substantially depressed and therefore frictionally engaged to the proximal end of the toothbrush handle. The tensioner assembly is comprised of at least one tension member or bar attached to a base such that the tension bar is bendably displacable relative to the base to exert tension upon the proximal end of the toothbrush handle. Insertion of the toothbrush handle into the music box causes the tension bar to bend and thus exert such tension.

Use of the resilient frictional engagement means and tensioner assembly permit the music box to accommodate a wide variety of sizes and configurations of toothbrush handles. Thus, the musical toothbrush of the present invention does not require the use of a particular toothbrush having a specific size and/or configuration, but rather may be used with a wide variety of pre-existing toothbrushes. The music box is removably attachable to the proximal end of the toothbrush handle such that the toothbrush may be utilized with or without the music box in place.

Additionally, toothbrushes typically wear out in three to six months whereas a music box is expected to last between one and two years. Thus, providing a music box which is removably attachable to a toothbrush provides substantial benefit over that of an integral toothbrush/music box assembly. The toothbrush can easily be replaced as required. Furthermore, a single music box may be utilized upon a plurality of different toothbrushes, i.e., as for the toothbrushes of more than a single child. Also, different music boxes may be attached to a given toothbrush as desired. This will be beneficial when more than a single music box design is available. For example, various music boxes having different faces or indicia formed thereon and generating different music or other sounds may be interchanged upon a single toothbrush. Thus, an entire integral toothbrush/music box assembly need not be discarded merely to provide either a new toothbrush or music box. This provides a substantial degree of diversity not available in integral toothbrush/music box devices.

The toothbrush of the present invention is designed primarily for making brushing more desirable for young children. By making the brushing process more desirable to young children, they will brush more often and for longer durations, thus deriving the intended therapeutic benefit therefrom. Additionally, use of the musical toothbrush of the present invention is intended to make the brushing experience an enjoyable one and to positively reinforce children for practicing this good habit. The duration of the music or other sound may optionally serve as a timer to indicate the desired duration of brushing to assure therapeutic benefit. The child merely brushes as long as the music plays.

The music box may optionally comprise a wall mount means whereby the music box is either permanently or detachably attachable to a wall surface or the like. Of course, permanent attachment to such a wall surface would prohibit the music box from being utilized upon the brush during the brushing process, but rather would require that the music box be activated and left in place during brushing. Temporary attachment to the wall would afford the user the choice of either leaving the music box attached to the wall during brushing or having the music box attached to the toothbrush. In any case, the music box may either be activated such that desirable sounds or music emanates therefrom or may alternatively remain inactive or quiet during the brushing process, as desired.

One such musical toothbrush is disclosed in U.S. Pat. No. 5,044,037 issued to Brown on Sep. 3, 1991. The Brown patent discloses a music box either attached permanently to or formed as an integral unit with the toothbrush. Brown teaches joining the music box to the toothbrush via a heat bonding technique or alternatively utilizing a single mold to form the toothbrush and music box as a single unit. As such, the music box of the Brown device is not removably attachable to the toothbrush as in the present invention. These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of a toothbrush having a music box attached to the proximal end of its handle according to the present invention;

FIG. 2 is an exploded view of the music box;

FIG. 3 is a cross-sectional side view of the proximal end of the toothbrush handle disposed within the music box and captured intermediate the tensioner assembly and resilient frictional engagement means; and FIG. 4 is a side view of the proximal end of the toothbrush handle as it is being inserted into the music box illustrating engagement thereof with the tensioner bar and teeth.

DETAILED DESCRIPTION OF THE INVENTION

The detailed description set forth below in connection with the appended drawings is intended as a description of the presently preferred embodiment of the invention, and is not intended to represent the only form in which the present invention may be constructed or utilized. The description sets forth the functions and sequences of steps for constructing and operating the invention in connection with the illustrated embodiment. It is to be understood, however, that the same or equivalent functions and sequences may be accomplished by different embodiments that are also intended to be encompasses within the spirit and scope of the invention.

The musical toothbrush of the present invention is illustrated in FIGS. 1 through 4 which depict a presently preferred embodiment of the invention. Referring now to FIG. 1, the musical toothbrush is comprised generally of a toothbrush 11 having a handle or proximal end 13 and a bristle or distal end 15 with bristles 17 formed upon the distal end 15 thereof also having a sound generation means or music box 19 formed upon the proximal end 13 thereof.

The music box 19 preferably has a face 21 formed upon the front housing 23 thereof. The toothbrush 11 enters the music box 19 through opening 55 formed in rear housing 25 thereof. A button 27 extends through the front housing 23 of the music box 19.

Referring now to FIGS. 2 through 4, an electronics module 31 is disposed within the music box 19 and contains the electronics required for the generation of music or other desired sound. Those skilled in the art will recognize that various electronic circuitry is suitable for the storage and generation of desired sounds. Furthermore, although the present invention is described in relation to a musical toothbrush, the use of music as the desired sound is by way of illustration only and not by way of limitation. Those skilled in the art will recognize that various sounds, e.g. stories, poems, and fanciful noises, etc., are likewise suitable.

Batteries 33, either permanent or removable, provide electrical power to the electronics module 31. The button 27 rests upon button seat 34 such that depressing button 27 likewise effects depression of the button seat 34 such that electrical first 35 and second 37 (best seen in FIG. 3) contacts provide electrical connection therebetween, thus initiating activation of the electronics module 31, causing it to produce music. The first switch contact 35 is disposed upon the distal end of spring arm 36 which provides tension to urge the switch seat 34 and button 27 into the extended or undepressed position. Speaker 59 both serves as a base for the electronics module 31 and as a transducer for reproducing the music.

A tensioner assembly 39 is attached via fasteners 41, preferably screws, to bosses 51 formed within the rear housing 25. The fasteners 41 pass through apertures 42 formed in the base 40 of the tensioner assembly 39. First and second 45 tension members or bars extend such that they may be bent by the proximal end 13 of the toothbrush 11 when the toothbrush 11 is inserted through the opening 55 of the lower housing 25.

With particular reference to FIG. 4, each tensioner bar 43 and 45 comprises a ramped portion 46 which slidably engages the distal end 13 of the toothbrush 11 during the insertion process such that as the toothbrush 11 is inserted, the tension bars 43 and 45 are bent upwardly, thus providing a downward force or tension upon the proximal end 13 of the toothbrush 11

The downward force or tension exerted by the tension bars 43 and 45 urges the proximal end 13 of the toothbrush 11 downward against a generally rectangular elongate resilient frictional engagement means 60 which is comprised of teeth 61. The generally rectangular elongate resilient frictional engagement means 60 is disposed within recess 57 formed within the rear housing 25. The teeth 61 are generally configured in a sawtooth arrangement and comprised of front or sloped surfaces 63, rear or substantially vertical surfaces 65, and tips 67.

First 47 and second 49 frames formed upon base 40 may optionally provide attachment of the first 43 and second 45 tension bars to the base 40. As illustrated, first tension bar 43 is attached through first frame 47 to base 40 and second bar 45 is not attached through second frame 49 to base 40. Attachment of a tension bar 43 or 45 through a frame 47 or 49 to the base 40 provides for adjustability of the tension imparted by the tension bar 43 or 45. By attaching a tension bar through a frame 47 or 49 to the base 40, the amount of tension provided thereby is substantially reduced to facilitate easier insertion of the toothbrush 11 into the music box 19. Thus, a means for varying, during manufacture, the insertion and removal force required is provided thereby.

A staggered or stairstep mating interface 53 is provided at the interface of the front 23 and rear 25 housings to facilitate reliable attachment thereof. A waterproof sheath (not shown) completely surrounds electronics module 31 to prevent water damage thereto.

Having described the structure of the musical toothbrush of the present invention, it may be beneficial to describe the function thereof. The handle or proximal end 13 of the toothbrush 11 is inserted into the opening 55 formed in the lower housing 25 of the music box 19 to facilitate attachment of the toothbrush 11 and music box 19 Such insertion requires generally moderate pressure as the proximal end 13 of the toothbrush 11 passes over the tips 67 of the teeth 61, the toothbrush 11 being urged downwardly onto the teeth 61 by first 43 and second 45 tension bars (as best seen in FIG. 4). The tips 67 of the teeth 61 are thus compressed and bent as the proximal end 13 of the toothbrush is inserted between the tensioner assembly 39 and the resilient frictional engagement means 60.

To remove the toothbrush 11 from the music box 19, the proximal end 13 of the toothbrush 11 is pulled from the opening 55 of the lower housing 25. Due to the serrated or sawtooth configuration of the teeth 61, it is generally easier to insert the distal end 13 of the toothbrush 11 between the tensioner assembly 39 and the resilient frictional engagement means 60 than to remove the distal end 13 of the toothbrush therefrom. During the insertion process the distal end 11 of the toothbrush 13 rides up along the sloped surfaces 63 of the teeth 61 causing them to bend over. Removal of the distal end 13 of the toothbrush 11 tends to further compress the tips 67 of the teeth 61, thereby increasing the force required for such removal. Thus, it is generally somewhat easier to effect insertion of the toothbrush 11 into the music box 19 than to effect removal therefrom. This facilitates easy attachment of the music box 19 to the toothbrush 11 while assuring that such attachment is secure.

Depressing button 29 of upper housing 23 causes a similar depression of switch seat 34 to effect electrical connection of first 35 and second 37 switch contacts to initiate the generation of desired music by the electronics module 31. Thus, the user merely picks up the toothbrush 11, typically already having the music box 19 attached thereto, and activates the electronics module 31 by depressing the button 27 such that music or another desirable emanates from the music box 19 for a period of time approximately equal to that required for therapeutic benefit from the brushing process.

It is understood that the exemplary musical toothbrush described herein and shown in the drawings represents only a presently preferred embodiment of the invention. Indeed, various modifications and additions may be made to such embodiment without departing from the spirit and scope of the invention. For example, various configurations and ornamental designs for the music box are contemplated. Additionally, various means for generating the desired sounds or music are likewise contemplated.

Furthermore, the retention means comprising the tensioner assembly and the resilient frictional engagement means need not be limited in application to the attachment of a toothbrush to a music box, but rather is suitable for use in a wide variety of different applications. The retention means may generally be used in various applications wherein it is desirable to attach two items together in a releasable fashion, particularly wherein it is desirable that the items become engaged utilizing a force that is somewhat less than that required for disengagement thereof. The retention means of the present invention provides a means for retaining items of various sizes and configurations due to the size accommodation provided by the tensioner assembly. Thus, variously sized and configured objects may be retained thereby without the need for manually adjusting the retention means.

These and other modifications and additions may be obvious to those skilled in the art and may be implemented to adapt the present invention for use in a variety of different applications.

What is claimed is:

1. A music box attachable to a toothbrush handle, said music box comprising:
   a) a housing having an elongated opening defined thereby, the elongated opening having a longitudinal axis;
   b) a music generation means disposed within said housing;
   c) a retention means disposed within said housing for releasably retaining the toothbrush handle, said retention means comprising:
      (i) a tensioner assembly; and
      (ii) a resilient frictional engagement means, said tensioner assembly and said engagement means being disposed at opposite sides of the opening in said housing, said engagement means comprising an plurality of teeth disposed proximate said tensioner assembly such that the toothbrush handle is positionable intermediate said tensioner assembly and said resilient frictional engagement means, said plurality of teeth comprising:
         (a) front surfaces formed at an acute angle to the longitudinal axis of the opening in said housing;
         (b) rear surfaces formed substantially perpendicular to the longitudinal axis of the opening in said housing; and
         (c) wherein said angled front surfaces facilitate comparatively easy insertion of the toothbrush handle intermediate the tensioner assembly and the resilient frictional engagement means and said perpendicular rear surfaces facilitate comparatively difficult removal of the toothbrush handle therefrom, said tensioner assembly urging the toothbrush handle toward said plurality of teeth to depress said plurality of teeth; and
         (d) wherein said retentions means facilitates attachment of the toothbrush handle to said music box in a secure and detachable manner such that the music box is easily attachable to a toothbrush and comparatively more difficult to remove therefrom.

2. A sound generation means attachable to a toothbrush handle, said sound generation means comprising:
   a) a housing having an elongated opening defined thereby, the elongated opening having a longitudinal axis;
   b) a sound generation means disposed within said housing;
   c) a retention means disposed within said housing of releasably retaining the toothbrush handle, said retention means comprising:
      (i) a tensioner assembly; and
      (ii) a resilient frictional engagement means, said tensioner assembly and said engagement means being disposed at opposite sides o the opening in said housing, said engagement means comprising a plurality of teeth disposed proximate said tensioner assembly such that the toothbrush handle is positionable intermediate said tensioner assembly and said resilient frictional engagement means, said plurality of teeth comprising:
         (a) a front surfaces formed at an acute angle to the longitudinal axis of the opening in said housing;

(b) rear surfaces formed substantially perpendicular to the longitudinal axis of the opening in said housing; and (c) wherein said angles front surfaces facilitate comparatively easy insertion of the toothbrush handle intermediate the tensioner assembly and the resilient frictional engagement means and said perpendicular rear surfaces facilitate comparatively difficult removal of the toothbrush handle therefrom, said tensioner assembly urging the toothbrush handle toward said plurality of teeth to depress said plurality of teeth; and (d) wherein said retention means facilitates attachment of the toothbrush handle to said sound generation means in a secure and detachable manner such that the music box is easily attachable to a toothbrush and comparatively more difficult to remove therefrom.

3. The sound generation means as recited in claim 2 wherein said tensioner assembly comprises:
 a) a base; and
 b) at least one tension member attached to said base such that said at least one tension member is bendably displacable relative to said base to exert tension upon the toothbrush handle.

4. The sound generation means as recited in claim 3 where said tensioner assembly further comprises at least one frame, the number of frames corresponding substantially to the number of tension members, through which said at least one tension member is attached to said base, said at least one frame being bendable to reduce the amount of tension exerted upon the toothbrush handle by said at least one tension member attached to the base through said said at least one frame.

5. The sound generation means as recited in claim 3 wherein said at least one tension member comprises a ramped portion configured to contact the toothbrush handle it is positioned intermediate said tensioner assembly and said resilient frictional engagement means.

6. The sound generation means as recited in claim 2 wherein said plurality of teeth are substantially sawtooth in configuration.

7. A musical toothbrush comprising:

a) an elongate handle having proximal and distal ends;

b) bristles formed of the distal end of said elongate handle;

c) a music box removably attached to the proximal end of said elongate handle, said music box comprising:

(i) a housing having an elongated opening defined thereby, the elongated opening having a longitudinal axis;

(ii) a music generation means disposed within said housing;

(iii) a retention means disposed within said housing for releasably retaining said elongate handle, said retention means comprising:

(a) a tensioner assembly; and (b) a resilient frictional engagement means, said tensioner assembly and said engagement means being disposed at opposite sides of the opening in said housing, said engagement means comprising a plurality of teeth disposed proximate said tensioner assembly such that said elongate handle is positionable intermediate said tensioner assembly and said resilient frictional engagement means, said plurality of teeth comprising: front surfaces formed at an acute angle to the longitudinal axis of the opening in said housing, rear surfaces formed substantially perpendicular to the longitudinal axis of the opening in said housing, and wherein said angle front surfaces facilitate comparatively easy insertion of the elongate handle intermediate the tensioner assembly and the resilient frictional engagement means and said perpendicular rear surfaces facilitate comparatively difficult removal of the elongate handle therefrom, said tensioner assembly urging said elongate handle toward said plurality of teeth to depress said plurality of teeth; and (d) wherein said retention means facilitates attachment of said elongate handle to said music box in a secure and detachable manner such that the music box is easily attachable to a toothbrush and comparatively more difficult to remove therefrom.

* * * * *